(12) United States Patent
Tower (10) Patent No.: US 10,731,945 B2
(45) Date of Patent: Aug. 4, 2020

(54) DETACHABLE SWIVEL COUPLING

(71) Applicant: Benjamin Stephen Tower, Columbia Falls, MT (US)

(72) Inventor: Benjamin Stephen Tower, Columbia Falls, MT (US)

(*) Notice: Subject to any disclaimer, the term of this patent is extended or adjusted under 35 U.S.C. 154(b) by 297 days.

(21) Appl. No.: 15/717,135

(22) Filed: Sep. 27, 2017

(65) Prior Publication Data

US 2018/0087867 A1  Mar. 29, 2018

Related U.S. Application Data

(60) Provisional application No. 62/401,181, filed on Sep. 29, 2016.

(51) Int. Cl.

| | |
|---|---|
| *F41C 23/02* | (2006.01) |
| *F16B 21/06* | (2006.01) |
| *F41C 33/00* | (2006.01) |
| *F16B 21/16* | (2006.01) |
| *F16B 45/00* | (2006.01) |

(52) U.S. Cl.
CPC .............. *F41C 23/02* (2013.01); *F16B 21/06* (2013.01); *F16B 21/165* (2013.01); *F41C 33/006* (2013.01); *F16B 45/00* (2013.01)

(58) Field of Classification Search
CPC ......... F41C 33/006; F41C 23/02; F16B 21/06
See application file for complete search history.

(56) References Cited

U.S. PATENT DOCUMENTS

| | | | | | |
|---|---|---|---|---|---|
| 2,375,719 | A | * | 5/1945 | Wirkkala | B66C 1/34 294/82.11 |
| 2,480,662 | A | * | 8/1949 | McKinzie | F41C 23/02 42/85 |
| 2,642,689 | A | * | 6/1953 | Cline | F41C 23/02 42/85 |
| 2,758,440 | A | * | 8/1956 | Magid | F41C 23/02 59/95 |
| 3,052,940 | A | * | 9/1962 | Sellers | F16B 21/165 411/555 |
| 3,061,965 | A | * | 11/1962 | Lewis | F41C 23/02 42/85 |

(Continued)

FOREIGN PATENT DOCUMENTS

| | | |
|---|---|---|
| CN | 205390562 U | 7/2016 |
| DE | 202012011836 U1 | 3/2013 |

*Primary Examiner* — Jason W San
(74) *Attorney, Agent, or Firm* — Kim and Lahey Law Firm, LLC; Seann P. Lahey (57) ABSTRACT

A housing having a vertically extending axial cavity. An internal body carried in the axial cavity and operable between a raised position and a lowered position within the axial cavity. A socket mount receiving at least a portion of the housing in releasable interlocking engagement. An actuator channel disposed in the housing extending transverse to the axial cavity. An actuating device extending through the actuator channel and engaging the internal body. The internal body is operatively associated with a releasable connection between the housing and the socket mount. The actuating device causes the internal body to be depressed and moved from the raised position to the lowered position within the axial cavity so that the releasable connection is disengaged to release the interlocking engagement of the housing from the socket mount.

18 Claims, 6 Drawing Sheets

(56) References Cited

U.S. PATENT DOCUMENTS

| | | | |
|---|---|---|---|
| 3,066,375 A | 12/1962 | Knowles et al. | |
| 3,430,305 A * | 3/1969 | Geffner | B64D 17/383 24/603 |
| 3,468,169 A * | 9/1969 | Welch | F16D 1/10 74/2 |
| 3,504,937 A * | 4/1970 | Panovic | F16G 15/08 403/164 |
| 4,144,794 A * | 3/1979 | Silverman | G10G 5/005 224/257 |
| 5,067,267 A | 11/1991 | Ives | |
| 5,148,582 A | 9/1992 | Dennis, Jr. | |
| 5,354,076 A * | 10/1994 | Yeo | B23B 31/26 279/110 |
| 5,692,654 A * | 12/1997 | Bell | F41C 23/02 224/150 |
| 6,152,645 A * | 11/2000 | Sanford | F16D 41/064 403/322.2 |
| 6,511,100 B1 * | 1/2003 | Le Clinche | F16L 37/23 285/314 |
| 6,793,237 B2 * | 9/2004 | Derrick | B60R 21/2037 24/453 |
| 7,637,230 B1 * | 12/2009 | Eicks | A01K 15/003 119/712 |
| 7,654,027 B1 * | 2/2010 | Grover | F16B 21/165 24/573.11 |
| 7,654,028 B1 * | 2/2010 | Grover | F41C 23/02 224/150 |
| 8,516,732 B2 * | 8/2013 | Burnsed, Jr. | F41C 23/02 24/573.11 |
| 8,793,916 B2 | 8/2014 | Rogers et al. | |
| 8,821,061 B2 * | 9/2014 | Baus | F16B 2/16 403/322.2 |
| 8,832,986 B2 | 9/2014 | Mayberry et al. | |
| 8,979,397 B2 * | 3/2015 | Henry | G03B 17/561 396/423 |
| 9,447,815 B2 * | 9/2016 | Roberts | F16B 45/00 |
| 10,066,759 B1 * | 9/2018 | Krueger | F16B 21/12 |
| 2006/0254113 A1 * | 11/2006 | Esch | F41C 23/02 42/85 |
| 2007/0199412 A1 * | 8/2007 | Lee | B25B 23/0035 81/177.85 |
| 2008/0003077 A1 * | 1/2008 | Anderson | F16B 19/109 411/347 |
| 2009/0214319 A1 * | 8/2009 | Bolleboom | F16B 21/165 411/348 |
| 2010/0206921 A1 | 8/2010 | Shen | |
| 2011/0008128 A1 * | 1/2011 | Soltis | B23B 31/1071 411/348 |
| 2012/0174458 A1 * | 7/2012 | Burnsed, Jr. | F41C 23/02 42/85 |
| 2013/0305582 A1 * | 11/2013 | Mayberry | F41C 33/006 42/85 |
| 2016/0123374 A1 * | 5/2016 | Roberts | F16B 45/00 294/215 |
| 2016/0146571 A1 * | 5/2016 | Howard | F41C 23/02 403/57 |

* cited by examiner

DETACHABLE SWIVEL COUPLING

BACKGROUND OF THE INVENTION

1) Field of the Invention

The present invention relates to a detachable swivel coupling, and more particularly to a quick disconnect swivel coupling ("QD swivel") that requires no fine-motor-skills to operate. The detachable swivel coupling of the present invention is easy to locate, grasp, detach, and reattach under physical and mental stress and under less-than-ideal conditions.

2) Description of Related Art

In the firearm components and accessories industry, detachable swivel couplings are commonly called "Quick Disconnect Swivel" a.k.a. "QD Swivel", or "Push Button Sling Swivel" a.k.a. "PBSS." These QD swivels have become commonly used items in the various branches of the US military, the civilian firearms market, and have even been adopted for use by foreign militaries.

Common QD swivels that have been produced in the past require complex movements and fine-motor-skills to manipulate. The most common in-use design is disclosed in U.S. Pat. No. 2,480,662. While this QD swivel has enjoyed widespread success and acceptance, the design was originally intended to be used as a way of conveniently removing a hunting rifle's sling for display or storage, and later conveniently reattaching the sling to ready the rifle for use. Since this design has been adopted for tactical applications, its crossover use has presented various tactical disadvantages. In particular, extracting the swivel from its socket mount requires a complex, counter-intuitive fine-motor-skill manipulation by the forefinger, the middle finger, and the thumb wherein the fingers pull the mounting link while the thumb depresses the small internal body to actuate the release mechanism, all before the user is able to remove the swivel from the socket mount. This is awkward and time consuming. Further, the overall size of this swivel is small and sometimes difficult to locate readily. Also, because the housing rotates freely in the mounting link, re-positioning the housing of the swivel to be inserted into its mount can sometimes prove to be difficult. Also, removal of the swivel from its mount requires the operator to impart forces in two opposing directions simultaneously, which is counter-intuitive. Further, reduced manual dexterity, whether by the use of gloves, being cold, being numb, being under extreme stress, etc. while operating this design adds further complications to the above listed disadvantages.

A more recent QD swivel disclosed in U.S. Pat. No. 7,654,027 attempted to solved the problem of potentially inadvertent swivel operation, but did not address other disadvantages. In particular, extracting the swivel from its socket mount requires a complex, counter-intuitive fine-motor-skill manipulation by the forefinger, the middle finger, and the thumb wherein the fingers pull the mounting link while the thumb depresses the small internal body to actuate the release mechanism, all before the user is able to remove the swivel from the socket mount. This is awkward and time consuming. Further, the overall size of this swivel is small and sometimes difficult to locate readily. Also, because the housing rotates freely in the mounting link, re-positioning the housing of the swivel to be inserted into its mount can sometimes prove to be difficult. Also, removal of the swivel from its mount requires the operator to impart forces in two opposing directions simultaneously, which is counter-intuitive. Further, reduced manual dexterity, whether by the use of gloves, being cold, being numb, being under extreme stress, etc. while operating this design adds further complications to the above listed disadvantages.

Another more recent QD swivel design disclosed in U.S. Pat. No. 8,516,732, addressed the problem of the complex manipulations required to extract the swivel of the type disclosed in U.S. Pat. No. 2,480,662, but lead to other disadvantages. Essentially this patent teaches the opposite of U.S. Pat. No. 2,480,662, wherein inserting the swivel into the socket mount now requires a complex fine-motor-skill manipulation that includes using the forefinger the thumb to secure the swivel's position, then actuating the release mechanism with the middle or ring finger before the user is able to insert the swivel into its socket mount. This arrangement is awkward and time consuming. As with other QD swivel designs, inserting the swivel into its mount requires the operator to impart forces in two opposing directions on the swivel simultaneously. This is similarly counter-intuitive. Inserting the swivel into its socket mount becomes even more difficult if the user has reduced manual dexterity as a result of coldness, numbness, or the wearing of gloves, etc.

Another more recent QD swivel design disclosed in U.S. Pat. No. 8,832,986, also solved the problem of requiring the operator to impart forces in two opposing directions simultaneously to remove the swivel from a mount, but did not address other disadvantages. In particular, extracting the swivel from its socket mount requires a complex fine-motor-skill manipulation that commonly includes using the forefinger and the thumb in a pinching manner to actuate the swivel's release mechanism to remove it. This type of motor skill is one of the first to be lost when any numbness has affected dexterity, and is less than ideal for this type of device. Also, because the housing rotates freely in the mounting link, re-positioning the housing of the swivel to be inserted into its mount can sometimes prove to be difficult. Further, the overall size of this swivel is small and sometimes difficult to locate readily. Also, reduced manual dexterity, resultant from things such as the use of gloves, being cold, being numb, extreme stress, etc., while operating this design adds further complications to the above listed disadvantages.

Durability has been a common problem with QD swivel designs of the prior art. In military use, a failure of the QD swivel can be a life threatening issue.

Accordingly, it is an object of the present invention to provide a detachable swivel coupling that is operable using only gross-motor skills to insert, reinsert, or remove the swivel from the socket mount.

It is a further object of the present invention to provide a detachable swivel coupling that has larger operational components to minimize the difficulty in locating the swivel and actuating its mechanism.

It is a further object of the present invention to provide a detachable swivel coupling that reduces the problem in difficulty of operation while having reduced manual dexterity.

It is a further object of the present invention to provide a detachable swivel coupling that reduces the problem of having to impart simultaneous opposing forces on the swivel in order to insert, reinsert, or remove the swivel from the socket mount.

It is a further object of the present invention to provide a detachable swivel coupling with components that are more easily repaired or replaceable in the field, is more durable, costs less to manufacture, is less complex to manufacture, and has increased versatility as a connector.

SUMMARY OF THE INVENTION

The above objectives are accomplished according to the present invention by providing a detachable swivel coupling comprising a housing having a vertically extending axial cavity; an internal body carried in said axial cavity and operable between a raised position and a lowered position within said axial cavity; a socket mount receiving at least a portion of said housing in releasable interlocking engagement; an actuator channel disposed in said housing extending transverse to said axial cavity; an actuating device extending through said actuator channel and engaging said internal body; wherein said internal body is operatively associated with a releasable connection between said housing and said socket mount, and; wherein said actuating device causes said internal body to be depressed and moved from said raised position to said lowered position within said axial cavity so that said releasable connection is disengaged to release the interlocking engagement of said housing from said socket mount.

In a further embodiment, an actuator control is disposed on said internal body, wherein said actuator control receives said actuating device to maintain engagement of said actuating device with a top portion of said internal body.

In a further embodiment, the actuator control comprises a groove disposed in said top portion of said internal body.

In a further embodiment, the groove is angled downward and extends from a top surface of said internal body into said actuator channel for receiving said actuating device extending through said actuator channel.

In a further embodiment, the actuating device comprises a lever member.

In a further embodiment, the actuating device comprises a cord member.

In a further embodiment, the cord member extends inward through said actuator channel on a first side of said housing, over a top portion of said internal body, and outward through said actuator channel on a second side of said housing.

In a further embodiment, the releasable connection comprises a ball bearing carried by said housing with a portion of said ball bearing being extendable through a bearing opening in said housing when biased by said internal body, and a detent disposed in an interior wall of said socket mount for receiving said ball bearing in interlocking engagement.

In a further embodiment, the detent comprises a circumferential groove in said interior wall of said socket mount so that said housing can swivel when in said interlocking engagement with said socket mount.

In a further embodiment, the internal body includes a first bearing surface and a second bearing surface, wherein said second bearing surface is adjacent to and recessed from said first bearing surface, whereby when said internal body is in said raised position said ball bearing engages said first bearing surface and is biased through said bearing opening in said housing for engagement with said detent, and wherein when said internal body is depressed into said lowered position said ball bearing engages said second bearing surface which retract said ball bearing into said housing for disengaging from said detent.

In a further embodiment, a spring is disposed in said axial cavity of said housing below a bottom portion of said internal body, wherein said spring engages and biases said internal body into said raised position.

In a further embodiment, the housing includes extension blocks disposed on opposite sides extending laterally outwardly, wherein said actuator channel extends through said extension blocks.

In a further embodiment, a connector channel is disposed below said actuator channel in said extension blocks that extends parallel with said actuator channel and transverse to said axial cavity for receiving a mounting link.

In a further embodiment, a connector channel is disposed in said housing and extending along an axis transverse to said actuator channel and said axial cavity for receiving a mounting link.

In a further embodiment, the detachable swivel coupling comprising a housing; an axial cavity extending from an open top side to a closed bottom side of said housing; an internal body carried in said axial cavity and operable between a raised position and a lowered position within said axial cavity; a socket mount receiving at least a portion of said housing in releasable interlocking engagement; a control arm disposed adjacent said housing; an actuator channel disposed in said control arm; an actuating device extending through said actuator channel and across a top portion of said internal body transverse to said axial cavity; wherein said internal body is operatively associated with a releasable connection between said housing and said socket mount, and; wherein said actuating device causes said internal body to be depressed and moved from said raised position to said lowered position within said axial cavity so that said releasable connection is disengaged to release the interlocking engagement of said housing from said socket mount.

In a further embodiment, the a connector channel is disposed below said actuator channel in said control arm for receiving a mounting link.

In a further embodiment, the detachable swivel coupling comprising a housing having a vertically extending axial cavity; an internal body carried in said axial cavity and operable between a raised position and a lowered position within said axial cavity; a socket mount receiving at least a portion of said housing in releasable interlocking engagement; an actuator channel disposed in said housing extending transverse to said axial cavity; a pair of grooves defining an actuator control disposed on opposite sides of a top portion of said internal body being angled downwardly and extending from a top surface of said internal body into said actuator channel; a cord member defining an actuating device that extends inward through said actuator channel on a first side of said housing, over said top portion of said internal body within said grooves, and outward through said actuator channel on a second side of said housing; wherein said internal body is operatively associated with a releasable connection between said housing and said socket mount, and; wherein pulling a distal end of said cord member in a direction away from said housing causes said internal body to be depressed and moved from said raised position to said lowered position within said axial cavity so that said releasable connection is disengaged to release the interlocking engagement of said housing from said socket mount.

The detachable swivel coupling of the present invention is the first swivel to offer complete functionality using only gross-motor-skills and motions. The impetus behind the development of this swivel was the recognition that speed, simplicity, and durability are imperative to war-fighters. Soldiering is a sometimes uncomfortable occupation; operating in hostile environments where enemy contact can occur at any time, and often in adverse conditions such as extreme cold, altitude, submersion, darkness, or after injury, and other QD swivels can be problematic to manipulate. For these reasons the detachable swivel coupling according to the present invention requires only gross-motor-skills to operate, offering users distinct advantages in all conditions.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of preferred embodiments and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
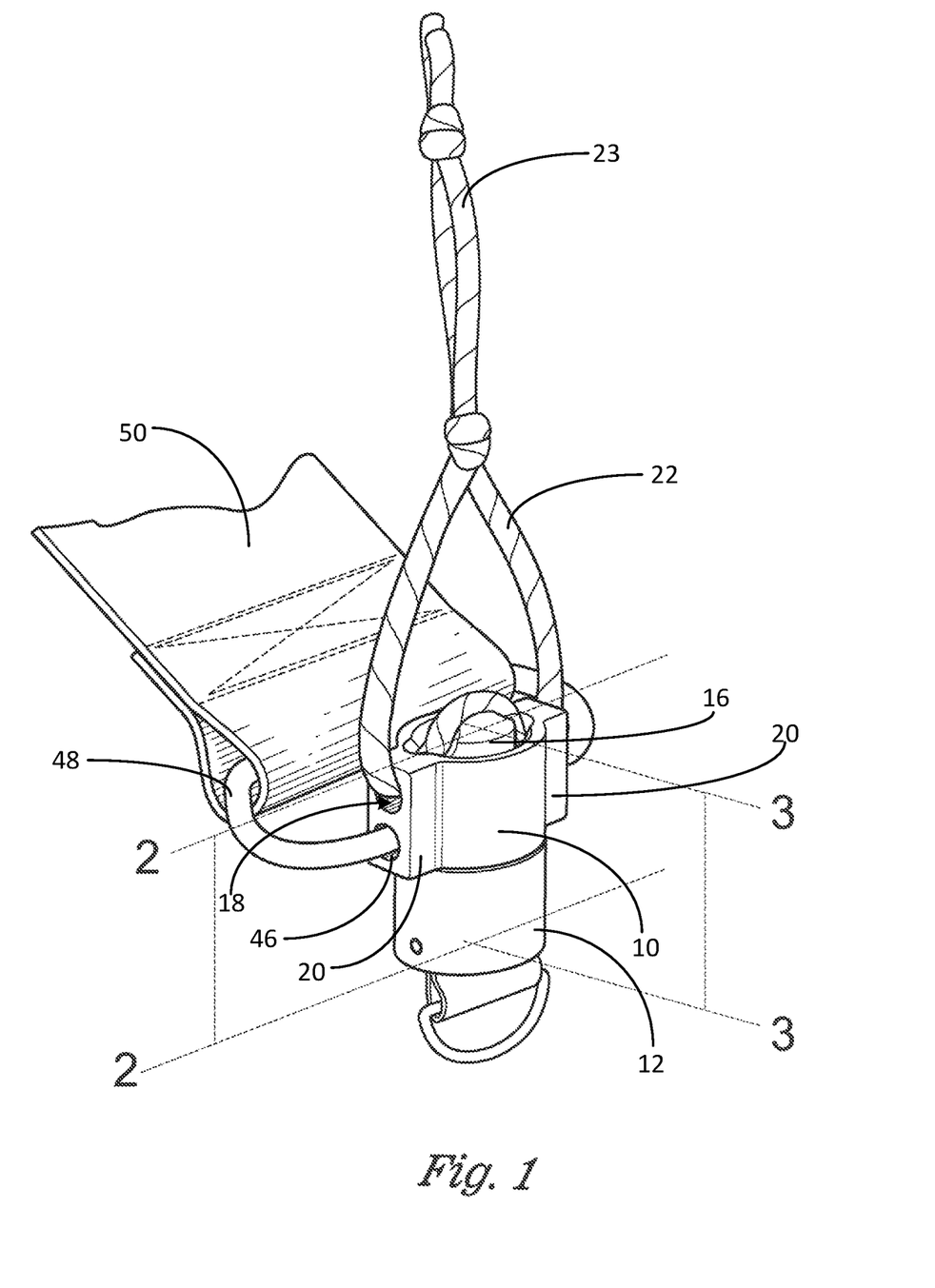
FIG. 1 shows a perspective view of a detachable swivel coupling according to the present invention.

Referring to FIG. 1, a detachable swivel coupling according to the present invention is shown. In the illustrated embodiment, the detachable swivel coupling includes a swivel portion defined by housing 10 and a socket mount 12 that receives at least a portion of housing 10 in releasable interlocking engagement.

Figure 2:
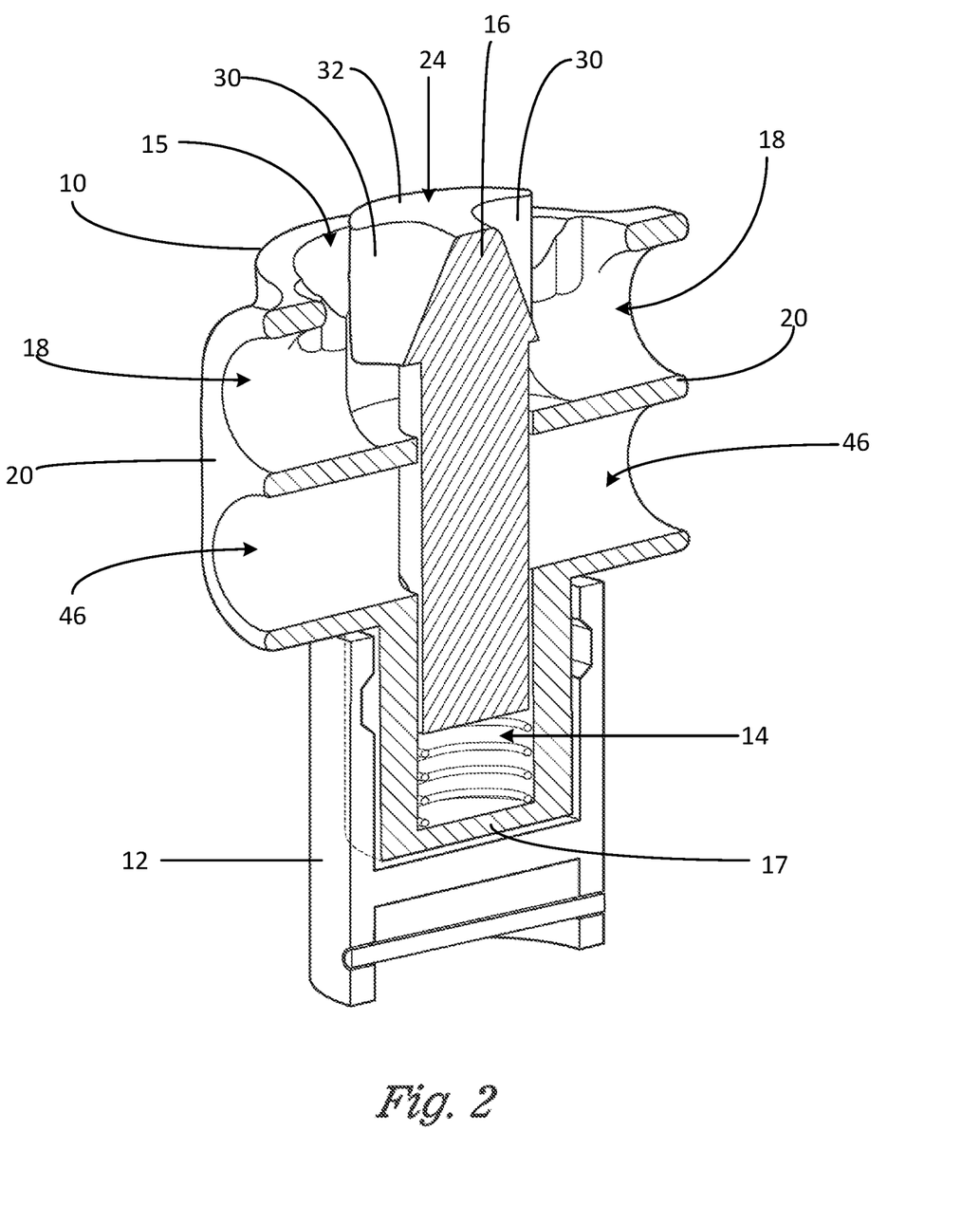
FIG. 2 shows a cross-section view of the detachable swivel coupling along section lines 2 from FIG. 1 according to the present invention.
Figure 3:
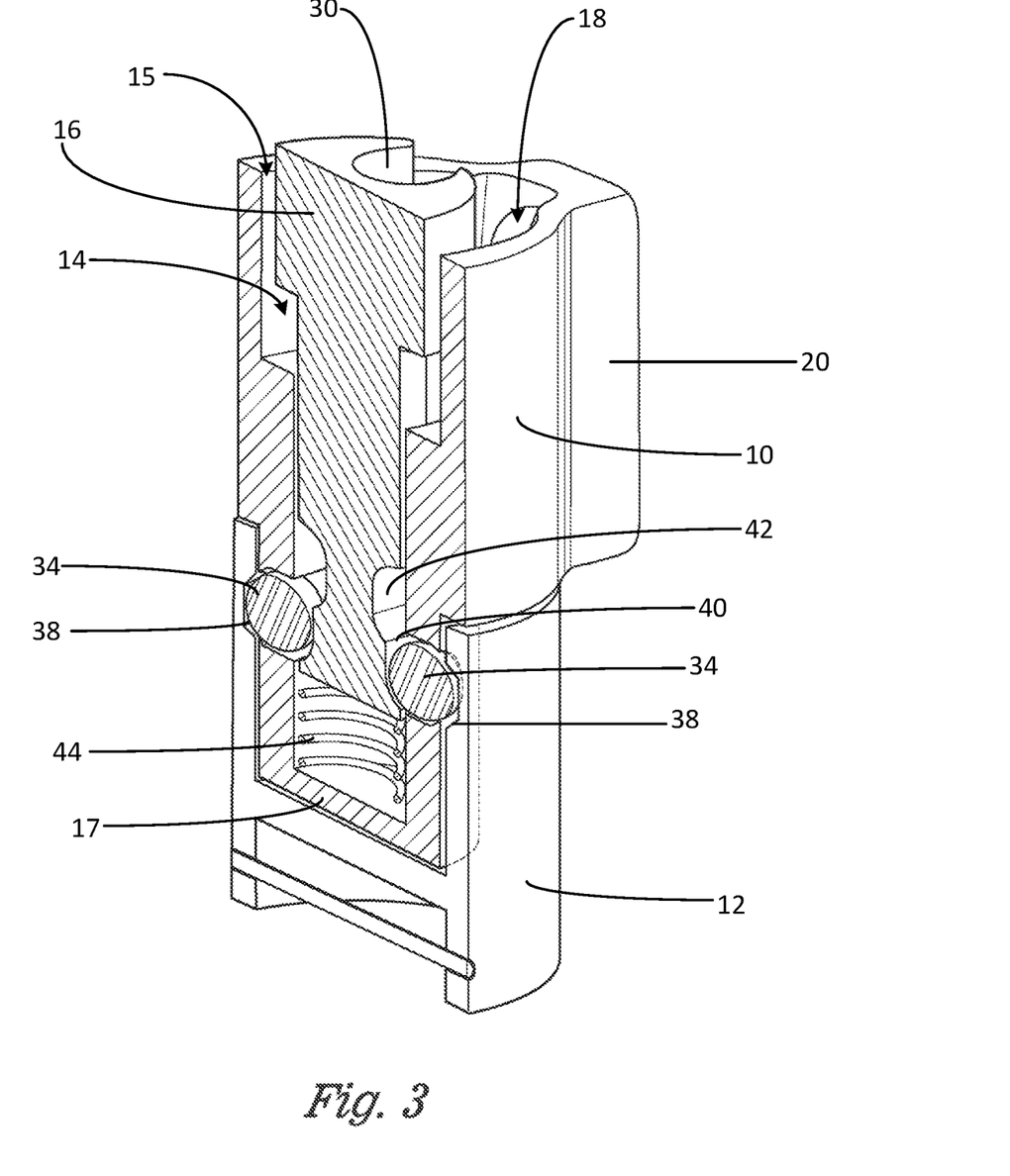
FIG. 3 shows a cross-section view of the detachable swivel coupling in interlocking engagement along section lines 3 from FIG. 1 according to the present invention.
Figure 3A:
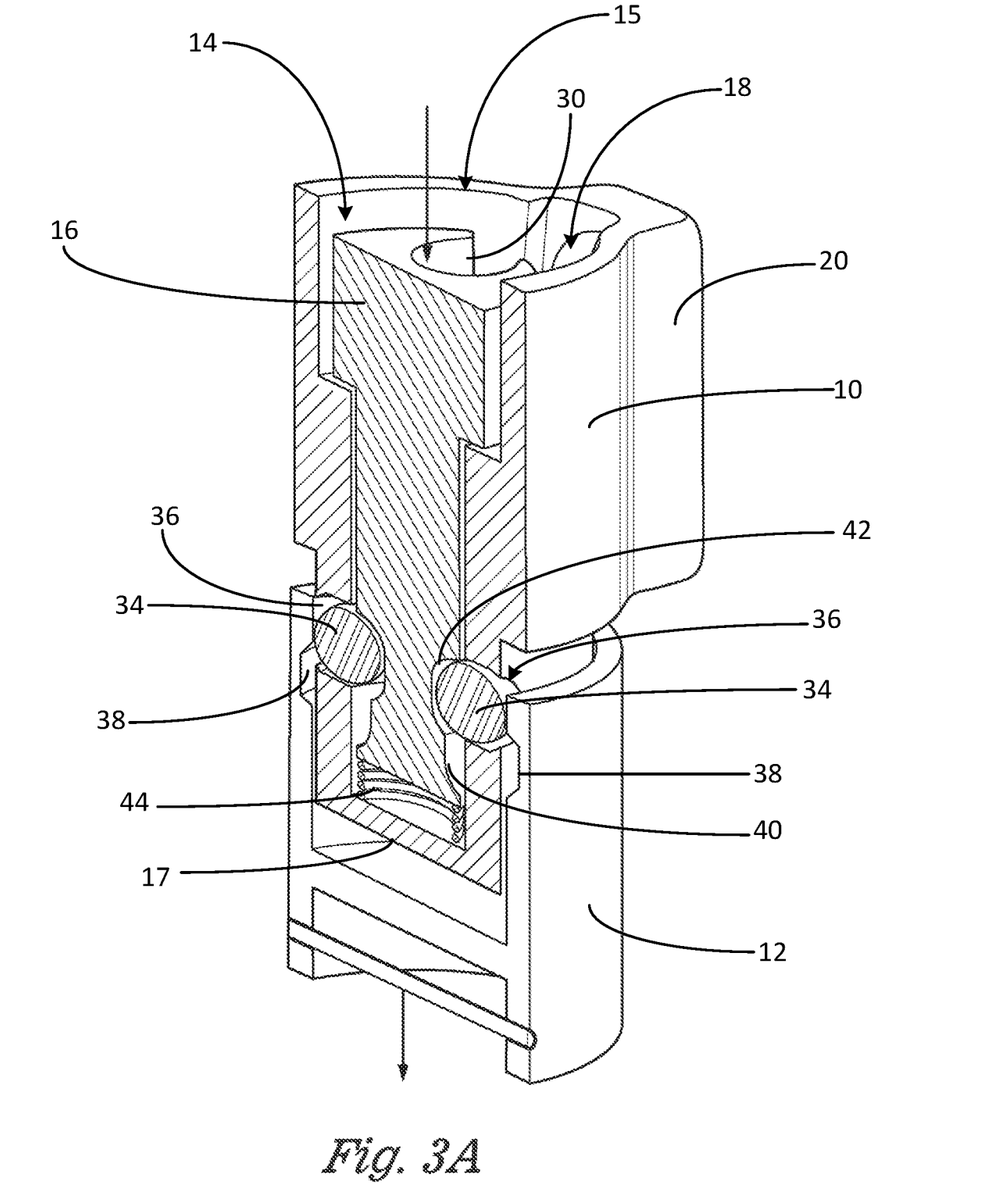
FIG. 3A shows a cross-section view of the detachable swivel coupling in a released arrangement along section lines 3 from FIG. 1 according to the present invention.

As best shown in FIGS. 2-3A, housing 10 includes an axial cavity 14. In the illustrated embodiment, axial cavity 14 extends in a vertical orientation within housing 10 from an open top side, designated generally as 15, to a closed bottom side 17 of housing 10. An internal body 16 is carried in axial cavity 14 and operable between a raised position (FIG. 3) and a lowered position (FIG. 3A) within axial cavity 14.

Figure 8:
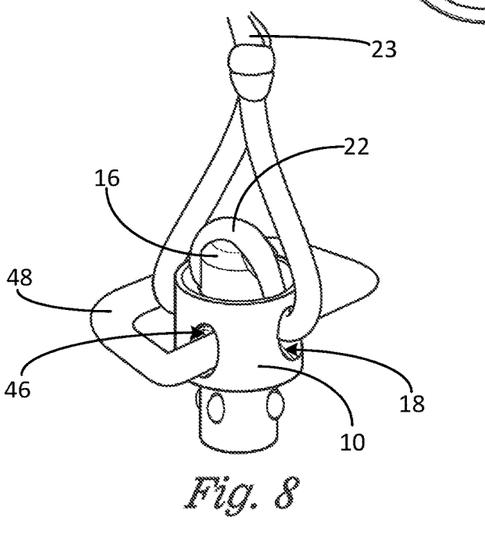
FIG. 8 shows a perspective view of an alternative embodiment of the detachable swivel coupling according to the present invention; and, FIG. 9 shows a perspective view of an alternative embodiment of the detachable swivel coupling according to the present invention.

Referring to FIGS. 2 and 8, at least one actuator channel 18 is disposed in housing 10 that extends along an axis transverse to axial cavity 14. Preferably, actuator channel 18 extends entirely through housing 10 on opposite sides of axial cavity 14. In a further embodiment, actuator channel 18 is oriented perpendicular to the vertically extending axial cavity 14.

Referring to FIGS. 1-3A, in the illustrated embodiment, housing 10 includes extension blocks 20 formed on opposite sides of housing 10 that extend laterally outward. In this embodiment, actuator channel 18 extends entirely through said extension blocks on opposite sides of axial cavity 14 and extending perpendicular to axial cavity 14. Extension blocks 20 are defined by thickened side walls of housing 10 which extend the length of actuator channel 18 to help control an actuating device 22.

Referring to FIG. 1, at least one actuating device 22 extends through actuator channel 18 and engages internal body 16. Internal body 16 is further operatively associated with a releasable connection between housing 10 and socket mount 12. Actuating device 22 causes internal body 16 to be depressed and moved from the raised position (FIG. 3) to the lowered position (FIG. 3A) within axial cavity 14 so that the releasable connection is disengaged to release the interlocking engagement of housing 10 from socket mount 12.

Figures 4, 5, 6:
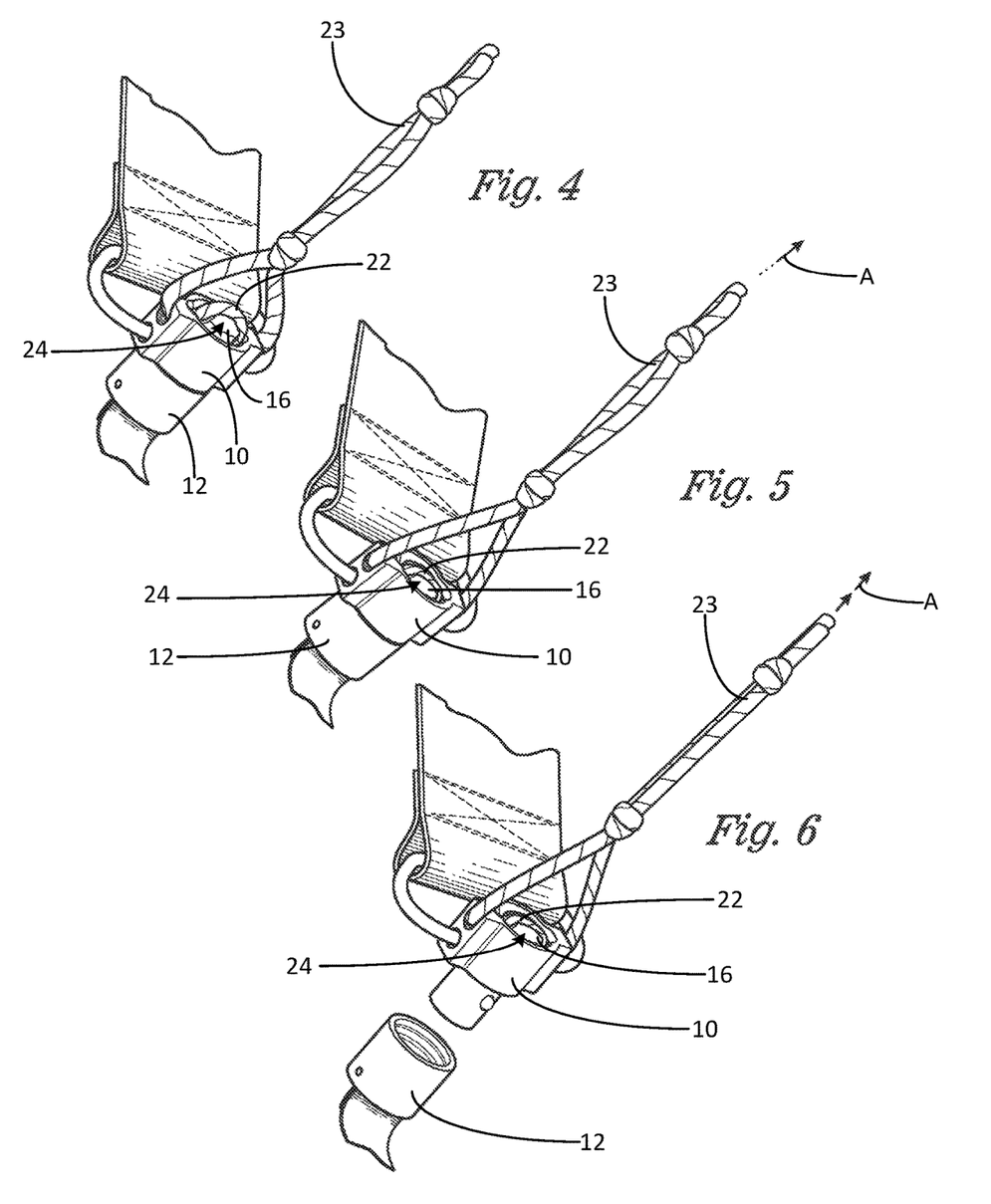
FIG. 4 shows a perspective view of the detachable swivel coupling in an interlocked arrangement according to the present invention.
FIG. 5 shows a perspective view of the detachable swivel coupling in a released arrangement according to the present invention.
FIG. 6 shows a perspective view of the detachable swivel coupling in a separated arrangement according to the present invention.

Referring to FIGS. 4-6, by routing actuating device 22 through actuator channel 18, forces applied to actuating device 22 are redirected in order to force actuating device 22 to operably contact and move internal body 16 from a raised position (FIG. 4) to a lowered position (FIGS. 5 and 6). In the illustrated embodiment, actuating device 22 comprises a cord member. The cord member includes an extended portion defining a handle 23 providing ergonomic control to the user for operating the actuating device 22. The cord member also extends inward through actuator channel 18 on a first side of housing 10, over a top portion, designated generally as 24, of internal body 16, and outward through actuator channel 18 on a second side of housing 10. Pulling on a distal end of the cord member in a direction, designated generally as A, away from housing 10 causes internal body 16 to be depressed and moved from the raised position to the lowered position within axial cavity 14 so that the releasable connection is disengaged to release the interlocking engagement of housing 10 from socket mount 12.

Figure 7:
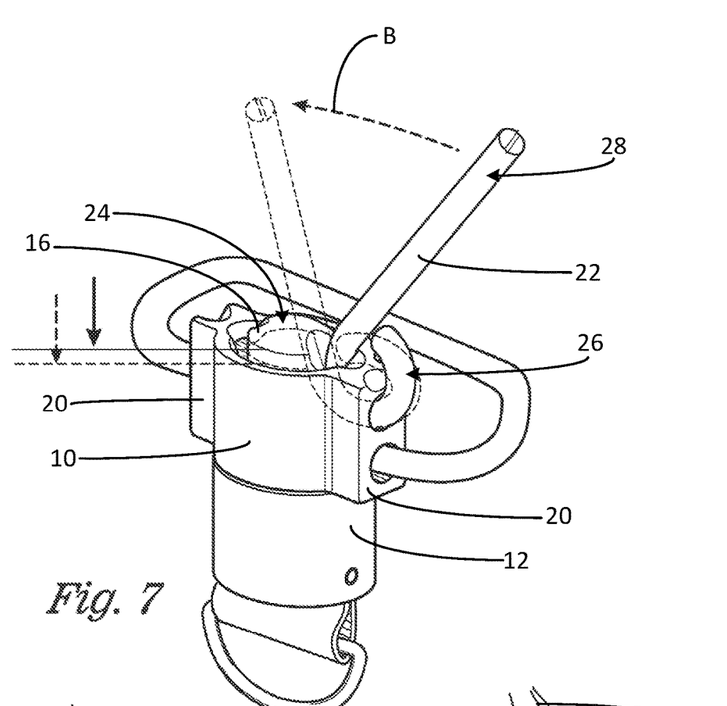
FIG. 7 shows a perspective view of the detachable swivel coupling having a lever actuating device according to the present invention.

Referring to FIG. 7, in one embodiment, actuating device 22 comprises a lever member. The lever member includes a first portion, designated generally as 26, that extends through actuator channel 18 and engages internal body 16, and a second portion, designated generally as 28, that extends outwardly from housing 10 to define a handle with which to manipulate the lever member. By applying a force to move the lever member in a direction, designated generally as B, the first portion 26 of the lever member is directed against top portion 24 of internal body 16 for moving internal body 16 from the raised position to the lowered position so that the releasable connection is disengaged to release the interlocking engagement of housing 10 from socket mount 12.

Referring to FIG. 2, in a further embodiment, an actuator control 30 is disposed on internal body 16, wherein actuator control 30 receives actuating device 22 to maintain engagement of actuating device 22 with top portion 24 of internal body 16. In the illustrated embodiment, actuator control 30 comprises a groove disposed in top portion 24 of internal body 16. Preferably, the groove is angled downward and extends from a top surface 32 of internal body 16 into actuator channel 18 for receiving actuating device 22 extending through actuator channel 18.

Referring to FIGS. 3 and 3A, in the illustrated embodiment, the releasable connection comprises a ball bearing 34, or other similar type retaining member, carried by housing 10 with a portion of ball bearing 34 being extendable through a bearing opening, designated generally as 36, in housing 10 when biased by internal body 16 in the raised position (FIG. 3). The releasable connection further comprises a detent 38 disposed in an interior wall of socket mount 12 for receiving said ball bearing in interlocking engagement. Preferably, detent 38 comprises a circumferential groove in the interior wall of socket mount 12 so that housing 10 can swivel when in said interlocking engagement with socket mount 12.

Internal body 16 further includes a first bearing surface 40 and a second bearing surface 42, wherein second bearing surface 42 is adjacent to and recessed from first bearing surface 40. When internal body 16 is in the raised position (FIG. 3), ball bearing 34 engages first bearing surface 40 and is biased through bearing opening 36 in housing 10 for engagement with detent 38. When internal body 16 is depressed into the lowered position (FIG. 3A), ball bearing 34 engages second bearing surface 42 which retracts ball bearing 34 into housing 10 for disengaging from detent 38.

In the illustrated embodiment, a spring 44 is disposed in axial cavity 14 of housing 10 below a bottom portion 17 of internal body 16, wherein spring 44 engages and biases internal body 16 into the raised position (FIG. 3).

Referring to FIGS. 1 and 2, in a further embodiment, a connector channel 46 is disposed below actuator channel 18 in extension blocks 20 that extends parallel with actuator channel 18 and transverse to axial cavity 14 for receiving a mounting link 48. Mounting link 48 may carry a strap 50 in one example, but may be associated with any number of items the can benefit from the detachable swivel coupling of the present invention. Referring to FIG. 8, in one embodiment, at least one connector channel 46 is disposed in housing 10 and extending along an axis transverse to actuator channel 18 and axial cavity 14 for receiving mounting link 48. Thus, in this embodiment, mounting link 48 is carried on an adjacent portion of housing 10 from actuator channel 18.

Figure 9:
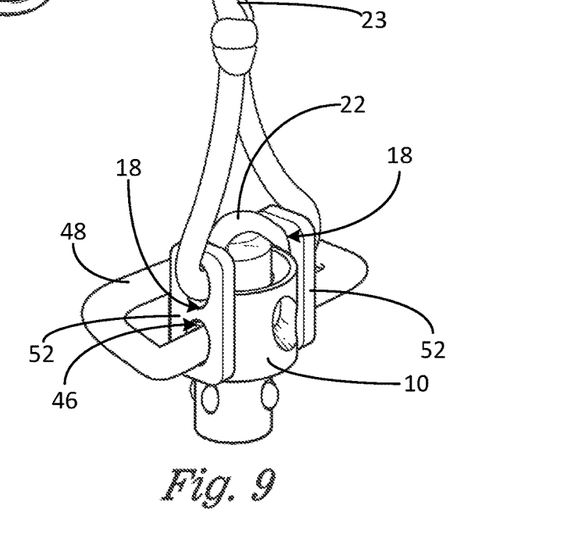

Referring to FIG. 9, in the illustrated embodiment, the detachable swivel coupling includes at least one control arm 52 disposed adjacent to housing 10. In this arrangement, actuator channel 18 is disposed in control arm 52 as opposed to housing 10. Actuating device 22 extending through actuator channel 18 in control arm 52 and across top portion 24 of internal body 16 transverse to axial cavity 14 of housing 10. Control arm 52 may being free floating or secured to housing 10 depending on the incorporation of mounting link 48. If use of mounting link 48 is desired, connector channel 46 is included below actuator channel 18 in control arm 52 for receiving mounting link 48. In this embodiment, housing 10 may also include a connector channel 46 for receiving mounting link 48, in which case control arm 52 may be free floating adjacent housing 10 and carried by mounting link 48 as opposed to secured to housing 10. Securing control arm 52 to housing 10 may be done by welding, epoxy, mechanical fasteners, etc.

In one embodiment, housing 10 may be a cylindrically shaped component containing a concentrically positioned cylindrically shaped axial cavity 14. Housing 10 is fashioned such that there is only one opening on top side 15, and that the upper half of housing 10 with the opening is wider in diameter than the lower half. The lower half contains at least one retention device such as ball bearing 34 or the like extendable through bearing openings 36. These bearing openings are swedged to retain the retention devices 34 within housing 10. Within or protruding laterally outwardly from the upper half of housing 10 are one or more actuator channels 18 to provide for the routing and containment of actuator device 22 as detailed herein above. The upper half of housing 10 may optionally include at least one connector channel 46 for attaching mounting link 48.

In one embodiment, internal body 16 is cylindrical in shape and moves within axial cavity 14 of housing 10 between the raised and lowered positions. Internal body 16 is partially disposed within axial cavity 14 and spring-biased in the raised position and requires sufficient imparted force to overcome the spring-bias in order to move it into the lowered position. When internal body 16 is in the raised position, the ball bearings 34 are locked into their outward-most positions. Imparting sufficient force to move internal body 16 into the lowered position permits ball bearings 34 to become partially recessed into internal body 16 and confined within housing 10.

Actuating device 22 is any supple yet robust material to include, but not limited to: string, rope, cord, yarn, thread, cable, or wire of natural, synthetic, polymer, rubber, metal, any combination thereof, or any substance that is flexible enough to be routed through actuator channel 18. In its resting state, actuating device 22 is flaccid and imparts no force upon internal body 16, permitting internal body 16 to maintain its spring biased state of the raised position. Actuating device 22 may have a handle 23 comprised of any object that attaches to it while still facilitating a pulling function.

The detachable swivel coupling of the present invention provides users with a more intuitively functioning detachable swivel by enabling a simple push to connect and pull to disconnect operation. In order to connect the swivel portion defined by housing 10, a user depresses internal body 16 toward socket mount 12 and inserts a portion of housing 10 into a fully seated position within socket mount 12. Upon a user releasing internal body 16, housing 10 remains locked within socket mount 12. In order to disconnect housing 10 from socket mount 12, a user grasps actuating device 22, preferably by way of handle 23, and pulls away from housing 10 and socket mount 12, causing actuating device 22 to depress internal body 16, thereby releasing housing 10 from socket mount 12.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A detachable swivel coupling comprising:
   a housing having a vertically extending axial cavity;
   an internal body carried in said axial cavity and operable between a raised position and a lowered position within said axial cavity;
   a socket mount receiving at least a portion of said housing in releasable interlocking engagement;
   an actuator channel disposed in said housing extending transverse to said axial cavity, wherein said actuator channel extends completely through said housing to form a continuous passage into said axial cavity so that at least a portion of said internal body is exposed to said actuator channel;
   an actuating device extending completely through said actuator channel from an exterior side of said housing into said axial cavity and engaging a top surface at a distal end of said internal body disposed adjacent to said actuator channel within said axial cavity;
   wherein said internal body is operatively associated with a releasable connection between said housing and said socket mount; and
   wherein said actuating device causes said internal body to be depressed and moved from said raised position to said lowered position within said axial cavity so that said releasable connection is disengaged to release the interlocking engagement of said housing from said socket mount.

2. The detachable swivel coupling of claim 1 including an actuator control disposed on said internal body, wherein said actuator control receives said actuating device to maintain engagement of said actuating device with a top portion of said internal body.

3. The detachable swivel coupling of claim 2 wherein said actuator control comprises a groove disposed in said top portion of said internal body.

4. The detachable swivel coupling of claim 3 wherein said groove is angled downward and extends from said top surface of said internal body into said actuator channel for receiving said actuating device extending through said actuator channel.

5. The detachable swivel coupling of claim 1 wherein said actuating device comprises a lever member.

6. The detachable swivel coupling of claim 1 wherein said actuating device comprises a cord member.

7. The detachable swivel coupling of claim 6 wherein said cord member extends inward through said actuator channel on a first side of said housing, over a top portion of said internal body, and outward through said actuator channel on a second side of said housing.

8. The detachable swivel coupling of claim 1 wherein said releasable connection comprises a ball bearing carried by said housing with a portion of said ball bearing being extendable through a bearing opening in said housing when biased by said internal body, and a detent disposed in an interior wall of said socket mount for receiving said ball bearing in interlocking engagement.

9. The detachable swivel coupling of claim 8 wherein said detent comprises a circumferential groove in said interior wall of said socket mount so that said housing can swivel when in said interlocking engagement with said socket mount.

10. The detachable swivel coupling of claim 8 wherein said internal body includes a first bearing surface and a second bearing surface, wherein said second bearing surface is adjacent to and recessed from said first bearing surface, whereby when said internal body is in said raised position said ball bearing engages said first bearing surface and is biased through said bearing opening in said housing for engagement with said detent, and wherein when said internal body is depressed into said lowered position said ball bearing engages said second bearing surface which retract said ball bearing into said housing for disengaging from said detent.

11. The detachable swivel coupling of claim 1 including a spring disposed in said axial cavity of said housing below a bottom portion of said internal body, wherein said spring engages and biases said internal body into said raised position.

12. The detachable swivel coupling of claim 1 wherein said housing including extension blocks disposed on opposite sides extending laterally outwardly, wherein said actuator channel extends through said extension blocks.

13. The detachable swivel coupling of claim 12 including a connector channel disposed below said actuator channel in said extension blocks that extends parallel with said actuator channel and transverse to said axial cavity for receiving a mounting link.

14. The detachable swivel coupling of claim 1 including a connector channel disposed in said housing and extending along an axis transverse to said actuator channel and said axial cavity for receiving a mounting link.

15. A detachable swivel coupling comprising:
a housing having a vertically extending axial cavity;
an internal body carried in said axial cavity and operable between a raised position and a lowered position within said axial cavity;
a socket mount receiving at least a portion of said housing in releasable interlocking engagement;
an actuator channel disposed in said housing extending transverse to said axial cavity; cavity, wherein said actuator channel extends completely through said housing to form a continuous passage into said axial cavity so that at least a portion of said internal body is exposed to said actuator channel;
a pair of grooves defining an actuator control disposed on opposite sides of a top portion of said internal body being angled downwardly and extending from a top surface of said internal body into said actuator channel from within said axial cavity;
a cord member defining an actuating device that extends inward completely through said actuator channel on a first side of said housing from an exterior side of said housing into said axial cavity, engaging said top surface at a distal end of said internal body disposed adjacent to said actuator channel within said axial cavity and extending along said grooves, and outward through said actuator channel on a second side of said housing;

wherein said internal body is operatively associated with a releasable connection between said housing and said socket mount, and;
wherein pulling a distal end of said cord member in a direction away from said housing causes said internal body to be depressed and moved from said raised position to said lowered position within said axial cavity so that said releasable connection is disengaged to release the interlocking engagement of said housing from said socket mount.

16. The detachable swivel coupling of claim 15 wherein said housing including extension blocks disposed on opposite sides extending laterally outwardly, wherein said actuator channel extends through said extension blocks.

17. The detachable swivel coupling of claim 16 including a connector channel disposed below said actuator channel in said extension blocks that extends parallel with said actuator channel and transverse to said axial cavity for receiving a mounting link.

18. The detachable swivel coupling of claim 15 wherein said releasable connection comprises a ball bearing carried by said housing with a portion of said ball bearing being extendable through a bearing opening in said housing when biased by said internal body, and a detent disposed in an interior wall of said socket mount for receiving said ball bearing in interlocking engagement.

* * * * *